United States Patent [19]

Prouty

[11] Patent Number: 4,666,110

[45] Date of Patent: May 19, 1987

[54] COLLAPSIBLE HOLDER FOR CRASH CYMBALS

[76] Inventor: Deane L. Prouty, 5550 Netherland Ave., Apt. 6D, Riverdale, N.Y. 10471

[21] Appl. No.: 799,939

[22] Filed: Nov. 20, 1985

[51] Int. Cl.[4] .................................................. F16L 3/00

[52] U.S. Cl. ....................................... 248/122; 84/421; 211/41; 248/177; 248/309.1

[58] Field of Search ............... 248/121, 122, 125, 176, 248/309.1, 309.2, 177, 114, 116, 175, 434, 172, 173, 316.8; 211/41; 84/421, 422 R, 422 H; D6/462, 463, 449, 407

[56] References Cited

U.S. PATENT DOCUMENTS

| | | | |
|---|---|---|---|
| D. 189,468 | 12/1960 | Harley et al. | D6/462 X |
| 281,966 | 7/1883 | Burgess | 248/175 X |
| 329,150 | 10/1885 | Eaton | 211/41 X |
| 599,799 | 3/1898 | Scott | 211/41 X |
| 913,955 | 3/1909 | Hansen | 248/125 X |
| 976,950 | 11/1910 | Tyner | 248/175 X |
| 1,822,087 | 9/1931 | Feingold | 211/41 X |
| 2,783,896 | 3/1957 | Agostini et al. | 248/125 X |
| 3,365,154 | 1/1968 | Hofmann | 248/176 X |
| 4,044,979 | 8/1977 | Lemmo | 248/407 X |
| 4,566,666 | 1/1986 | Meska et al. | 248/309.1 X |

FOREIGN PATENT DOCUMENTS

| | | | |
|---|---|---|---|
| 993354 | 5/1965 | United Kingdom | 248/125 |

*Primary Examiner*—J. Franklin Foss
*Assistant Examiner*—David L. Talbott
*Attorney, Agent, or Firm*—Rohm & Monsanto

[57] ABSTRACT

A holder for a pair of crash cymbals of the type which are generally employed in orchestral performances is constructed to be collapsible for facilitating storage thereof and transportation between engagements of a percussionist. A pair of cymbal holder members, each of which is symmetrical, utilizes a coupling member for joining the cymbal holders to one another. In accordance with the invention, the cymbal holders are rotatably coupled to the coupling member, but fixable at selectable rotational orientations by operation of respectively associated locking devices. Penetration of the locking devices into the cymbal holders, while in a locked state, ensures a secure locking, or fixation, of the cymbal holders, while reducing the need for high thread stress in the coupling member. The locking devices also serve to fix the crash cymbal holder in a folded state which provides the desired advantages of compactness. Thus, lightweight materials which are not capable of withstanding high stresses can be used in the practice of the invention with excellent durability.

3 Claims, 4 Drawing Figures

COLLAPSIBLE HOLDER FOR CRASH CYMBALS

BACKGROUND OF THE INVENTION

This invention relates generally to holders and stands, and more paticularly to a collapsible holder of percussion musical instruments, such as crash cymbals, wherein the cymbals are supported at a convenient height for a musician during a performance, and can easily be collapsed for portability and ease of transportation between engagements and for storage.

It is well known that musicians, particularly percussionists, are required to transport and store a multiplicity of bulky instruments and accessories, such as drums, holders for drums, cymbals, cymbal stands, and a variety of other devices and miscellaneous items of percussion. Oftentimes, such items, particularly the stands, are difficult to handle in view of their relatively awkward configurations. It is highly desirable that such stands be made not only easier to handle during transportation to and from engagements, but also more compact during such transportation than when in the deployed state during a performance.

One specific area where there is a need for improvement along the lines discussed above is in the field of stands for crash cymbals of the type which are used predominantly in orchestral and march organizations. Such crash cymbals are generally used in pairs and must generally be positioned during a performance in orientations whereby a performer can readily access the cymbals, one in each hand, use the cymbals musically, and return them quickly so that he or she can resume the playing of another percussion instrument. Of course, there generally is not much time available for the performer to pick up and return the cymbals. This fact notwithstanding, many performers forego use of a stand which would facilitate the pick-up and release of the cymbals because those stands which are presently commercially available are very bulky and add too much bulk to the percussionists complement. Additionally, crash cymbal stands of the type presently available are of fixed dimensions and configurations and therefore may not be easily adapted for crash cymbals of different dimensions.

It is evident from the foregoing that there exists a need for a crash cymbal stand which can overcome the deficiencies noted hereinabove. More specifically, there is a need for a holder for crash cymbals which can be configured into a compact shape when it is not deployed for performance. Additionally, there is a need for a crash cymbal holder whic can be adjusted to accommodate cymbals of various sizes.

It is, therefore, an object of this invention to provide a holder for crash cymbals which is simple in construction and inexpensive to produce.

It is another object of this invention to provide a cymbal stand or holder which is advantageously collapsible into a compact shape for facilitating its transportation.

It is a further object of this invention to provide a holder for crash cymbals which is adjustable so that it can be used with cymbals of a variety of dimensions.

It is also an object of the present invention to provide a holder for crash cymbals which in addition to being collapsible is also universally mountable on an existing upright stand.

It is additionally an object of this invention to provide a deployable holder for crash cymbals which can be constructed of relatively lightweight materials, such as a plastic material, or one of the light but relatively soft metals, such as aluminum, which additionally is relatively inexpensive.

It is a still further object of this invention to provide a deployable holder for crash cymbals which can be locked securely in a selected position without requiring use of hardened materials.

SUMMARY OF THE INVENTION

The foregoing and other objects are achieved by this invention which provides a holder for a pair of crash cymbals wherein first and second holder members, each having respective first and second cymbal holder portions, are provided; each such holder member communicating with each of the crash cymbals. In accordance with the invention, the first and second cymbal holder portions in each holder member are mechanically joined to one another by a bridging portion. In certain embodiments of the invention, the bridging portion may be formed integrally with the first and second cymbal holder portions which it joins together. Coupling means are provided for rotatably coupling with the first and second holder members at respective engagement portions thereof. In one embodiment, the engagement portions of the coupling means join with the first and second holder members at their respective bridging portions. At each engagement portion of the coupling means is provided a locking means which is used to lock the respectively associated one of the holder members to the coupling means at a selected orientation. In a preferred embodiment, each such locking means is threadedly engaged with the coupling means.

Each of the locking means, in one highly advantageous embodiment of the invention, is preferably formed of a threaded member which is joined to a manually actuatable portion which facilitates manipulation thereof. The threaded member threadedly engages with a tapped hole in the coupling means. Preferably, the threaded member penetrates into the bridging portion of the associated holder member. Such penetration permits a secure locking of the position of the holder member, without requiring an excessive torque to be applied to the locking means. Thus, the possibility of stripping the thread of the coupling means is substantially reduced, and there is not a need for use of hardened materials. However, such penetration, which will generally require the drilling of a hole into the bridging portion of the holder member, need not be used in situations where the holder has been adjusted to accommodate a crash cymbal of a size other than the size which the performer normally uses. The use of a penetration hole in the bridging portion will, however, reduce overall stress in the arrangement and permit use of lighter materials than those encountered in commercially available holders. Of course, a plurality of such penetration holes can be provided so that the benefits thereof can be obtained at a variety of adjustment states.

In a highly advantageous embodiment of the invention, the holder members should be rotatable sufficiently so that they can be arranged almost parallel with the elongated coupling means. In such orientation, the arrangement assumes very compact dimensions for storage or transport. Preferably, the holder members should be lockable in this orietation so that the compact shape is maintained during handling.

It is highly desirable that the coupling means be provided with an arrangement whereby it can be mounted on a percussionist's stand of known type. Many percussionists already own a variety of stands, such as height-adjustable cymbal stands, and substantial economy is achieved by obviating the need to purchase a specially adapted stand for the holder of the present invention. Generally, all that will be required to permit such mounting on a known stand is a through-hole in the coupling means.

In accordance with a process aspect of the invention, the crash cymbal holder of the present invention is formed by the steps of: covering respective portions of each of first and second lengths of bar stock with a resilient material having damping characteristics; making a first bend in each of the covered portions of substantially U-shape at a first predetermined distance from an end of the bar stock; making a second bend in the covered portions of substantially ninety degrees at a second predetermined distance from the end of the bar stock; forming first and second through holes substantially parallel with one another in a length of coupling stock; inserting unbent portions of the first and second lengths of bar stock through respective ones of the first and second through holes until further insertion is prevented by the covering of resilient damping material; covering the unbent portions of the first and second lengths of the bar stock to a point therealong where further covering is prevented by the coupling stock; bending the unbent covered portions of the first and second lengths of the bar stock substantially symmetrically with respect to the bends made in the uninserted portions; drilling first and second apertures in the coupling stock and continuing the drilling partially into the first and second lengths of the bar stock; tapping the apertures in the coupling stock to for internal threads; and engaging a threaded locking member in each such threaded aperture The crash cymbal holder constructed in accordance with the foregoing process has the advantage of economy and simplicity. For example, alignment of the bar stock within the through holes is maintained by operation of the covering of the resilient damping material. Thus, there is not a need for expense-producing crimping or other mechanisms or manufacturing steps to ensure that the desired alignment is maintained.

BRIEF DESCRIPTION OF THE DRAWING

Comprehension of the invention is facilitated by reading the following detailed description in conjunction with the annexed drawing, in which.

DETAILED DESCRIPTION

Figure 1:
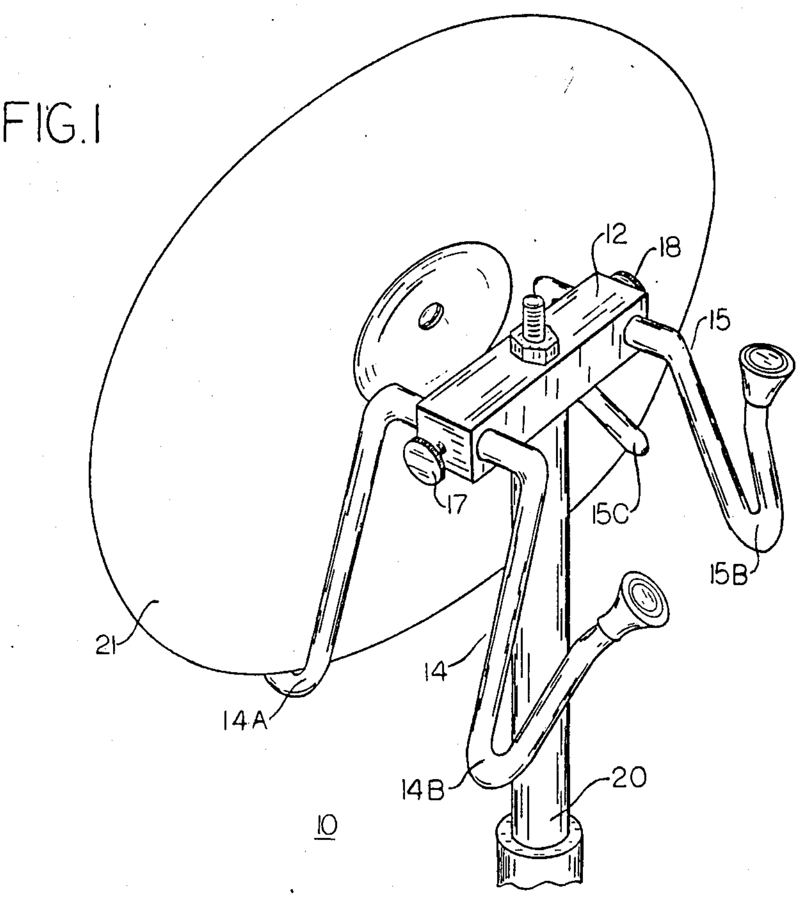
FIG. 1 is an isometric representation of a crash cymbal holder constructed in accordance with the invention.

FIG. 1 shows an isometric representation of a crash cymbal holder 10 constructed in accordance with the invention. The crash cymbal holder is shown to be formed of a coupling member 12 which couples a pair of holder members 14 and 15 to the crash cymbal holder. The holder members are rotatably engaged with the coupling member, and are locked in a selectable rotational orientation by operation of respectively associated ones of locking members 17 and 18. In the specific illustrative embodiment, locking member 17 is associated with holder member 14, and locking member 18 is associated with holder member 15. Also in this specific embodiment, the locking members are threadedly engaged (not specifically shown in this figure) with the coupling member. Such engagement will be described hereinbelow with respect to FIG. 2.

FIG. 1 further shows that coupling member 12 has a somewhat elongated configuration. Holder members 14 and 15 can be rotated so that they are substantially parallel with the coupling member. When the crash cymbal holder is thus arranged, a compact shape (not shown) is achieved which facilitates storage of the holder, as well as its transportation to and from performances.

Each of holder members 14 and 15 is formed of essentially two portions 14*a* 14*b*, and 15*a* 15*b*, respectively. In this embodiment, such portions are substantially coplanar, further reducing the overall dimension and flatness of the crash cymbal holder when it is folded for transport or storage.

FIG. 1 shows crash cymbal holder 10 to be installed upon a stand 20 (not shown in its entirety) which is advantageously adjustable in height to achieve a comfortable disposition of the crash cymbals, such as crash cymbals 21, for the percussionist. Of course, such a stand need not be adjustable, and may be of any of several known and commonly available types. Coupling member 12 is adapted for coupling to the stand, such as by the provision of a through-hole therein.

Holder members 14 and 15 are coated with a resilient damping material which dampens the vibrations of the crash cymbals when they are disposed thereon. Such a damping material may be applied by any of several known techniques, including spraying, dipping, painting such as with a brush, or by installation of a sleeve or tubing of the material. As will be described hereinbelow with respect to a process aspect of the invention, the installation of the material in the form of a tubing is preferred because the material is arranged closely in the vicinity of the coupling member and therefore serves to maintain a desired amount of alignment of the holder members with respect to the coupling member. A tubing ensures a sufficient thickness of the material in the vicinity of the coupling member.

Figure 2:
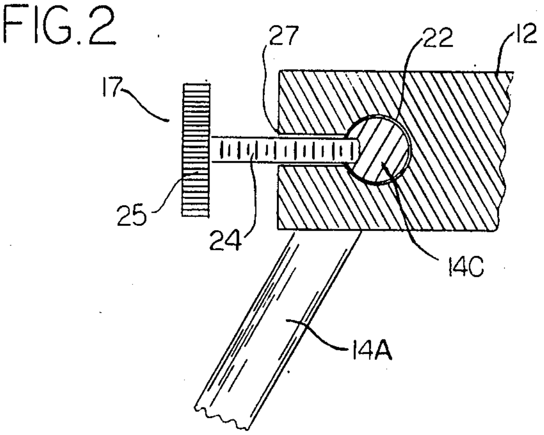
FIG. 2 is a cross-sectional representation of a portion of the embodiment of FIG. 1 showing the locking arrangement.

FIG. 2 is a cross-sectional representation of the locking arrangement used in the specific illustrative embodiment of FIG. 1. As shown in FIG. 2, coupling member 12 is provided with a through hole 22 which is shown to accommodate a bridging portion 14*c* of holder member 14. The locking arrangement associated with holder member 15 is not shown in this figure, but is similar to that shown herein.

Locking member 17 is shown to be constructed of two portions; a threaded shaft portion 24 and a manually actuatable portion 25. Threaded shaft portion 24 is threadedly engaged with an internally threaded hole 27 which has been drilled and tapped in coupling member 12. Threaded hole 27, however, is shown to extend beyond the internal surface of through hole 22 and partially into bridging portion 14*c* of the holder member. When manually actuatable portion 25 of locking member 17 is rotated so that the threaded shaft portion moves inwardly, the threaded shaft portion is ultimately driven, in this embodiment, into bridging portion 14c, thereby ensuring a secure locking in which rotation of the holder member with respect to the coupling member is prevented. Of course, the partial hole in bridging portion need not be utilized in the manner described herein, and may be omitted altogether in certain embodiments. Even if such a partial hole is provided, it need not be use when the crash cymbal holder is folded, such as for storage or transportation, or when the rotational orientation desired between the holder member and the coupling member is varied so as to accommodate cymbals of other sizes.

Figure 3:
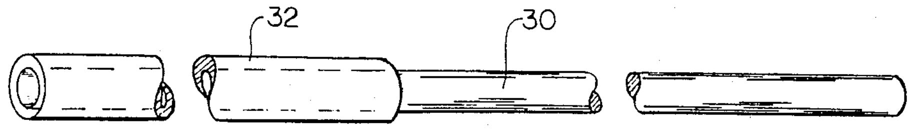
FIG. 3 is a partially fragmented representation of a length of bar stock partially covered with a resilient damping material.

FIG. 3 illustrates an early step in the production of the crash cymbal holder. A length of bar stock 30 is coated over portion of its length with a resilient damping material 32. In this embodiment, the coating of resilient damping material is of a thickness which is best achieved by installing a tubing or sleeve of the material over the bar stock. In a specific embodiment, the bar stock may be of a soft metal, such as aluminum in the form of a rod. One known alloy of aluminum which is particularly suited for this purpose is designated as 6016 alloy. The resilient damping material may be in the form of a PVC tubing. Since the tubing is preferred to be tightly fitted around the bar stock, it may be necessary to heat the tubing during the installation. Additionally, a small amount of lubricant may be used to facilitate the installation.

Figure 4:
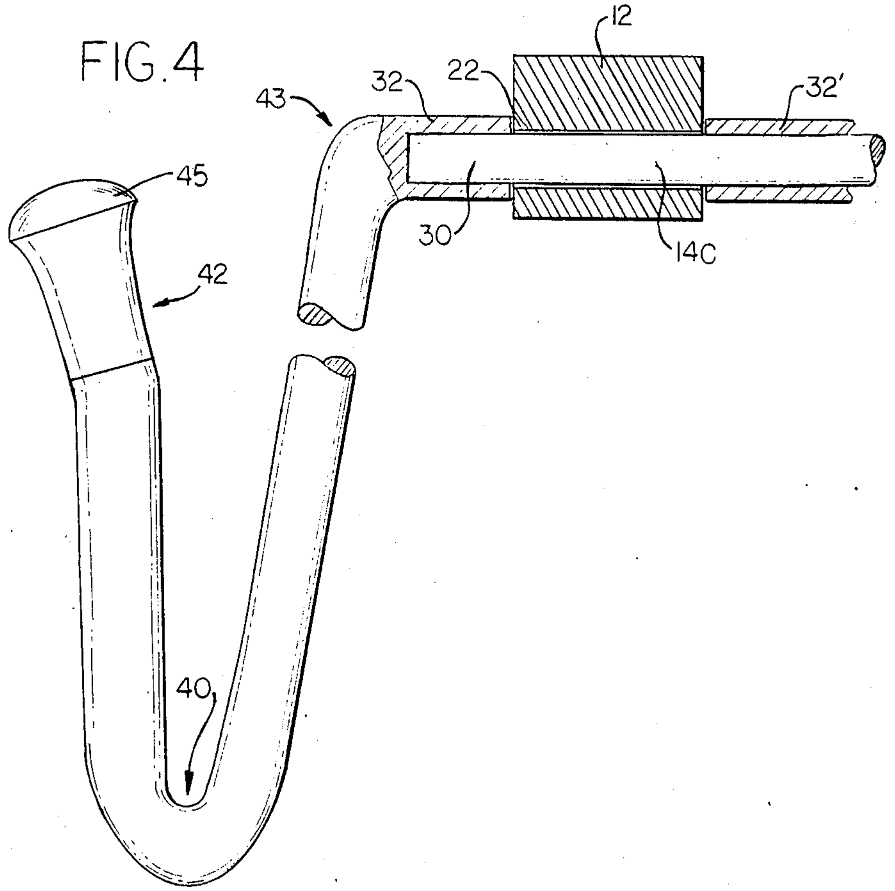
FIG. 4 is a simplified cross-sectional representation of a portion of a crash cymbal holder in the process of being constructed in accordance with the invention.

FIG. 4 is a partially cross-sectional representation of coupling membr 12 with the coated bar stock installed thereon. As shown, the bar stock and the resilient damping material are bent in a substantial U-shape at a region 40 which is located at a first predetermined distance from an end 42 of the bar stock. The bar stock and its covering of resilient damping material are bent substantially ninety degrees at a further region 43 which is located at a second, longer distance from end 42 of the bar stock. In order to improve the damping characteristic of the crash cymbal holder, end 42 is terminated with a termination 45 which prefereably is formed of a resilient damping material which is softer than that which coats the bar stock.

After such bending as described hereinabove, the uncoated portion of the bar stock (see FIG. 3) is inserted into through hole 22 of coupling member 12. In this figure, coupling member 12 is illustrated cross-sectionally to show the uncoated bar stock disposed therein. As indicated above, the portion of uncoated bar stock which is disposed within through hole 22 is designated as bridging portion 14c. After the insertion into the though hole, the uncoated portion of the bar stock which extends beyond the coupling member is coated with a resilient damping material 32'. Resilient damping material 32' is preferably of the same type as resilient damping material 32 which was first applied to the bar stock, and will be applied in the same manner. It should be noted that the resilient damping material on both sides of the coupling member should be brought into reasonably close communication with the coupling member since such will serve to maintain a desired alignment of the holder member within the coupling member.

The newly coated portion of the bar stock is subsequently bent into a shape which mirrors symmetrically the bends in regions 40 and 43 on the other side thereof. Additionally, the distal end is terminated in a manner similar to that of the other end, illustratively with an end termination such as termination 45. This process is repeated to complete the other holder member.

Once the holder members have been completely formed, the coupling member can be drilled to accommodate the locking members at respective ends thereof. As previously indicated herein with respect to FIG. 2, such drilling may penetrate partially into bridging portion 14c and the bridging portion of holder member 15 (not shown). The drilled holes are then tapped in a known manner and the locking members are installed therein, Finally, a through hole may be drilled into the coupling member for mounting onto a stand, as discussed herinabove.

Although the invention has been disclosed in terms of specific applications and embodiments, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. A holder for a pair of crash cymbals, the holder comprising:

first the second holder members, each having first and second cymbol holder portions for communicating with respective ones of the pair of crash cymbals, and a substantially cylindrical bridging portion for coupling said first and second cymbal holder portions to one another;

coupling means having an elongated configuration and a respective engagement portion at each end thereof, each such portion having a through-hole therein for accommodating a respective one of said substantially cylindrical bridging portions of said first and second holder members, whereby said first and second holder members are each rotatable in their associated through-holes with respect to said coupling means; and first and second locking means for fixing respective ones of said first and second holder members each at selectable rotational orientations with respect to said coupling means, each of said first and second locking means being manually actuatable to communicate threadedly with said coupling means whereby a portion of each of said locking means peretrates into a respective one of said holder members.

2. The holder of claim 1 wherein said first and second cymbal holder portions of said first and second holder members are substantially coplanar with respect to one another in respective planes of said first and second holder members, each of said holder members being, rotatable by an angle at approximately at least 90° with respect to said coupling means between deployed and collapsed positions, whereby said holder members are substantially parallel to one another when both are in either of said deployed and collapsed positions, said first and second locking means being adapted to fix said first and second holder members selectably in said deployed or collapsed positions.

3. The holder of claim 1 wherein there is further provided stand means detachably coupled to said coupling means, said stand means being elongatable for permitting adjustment of a height of the holder.

* * * * *